(12) United States Patent
Guimet et al.

(10) Patent No.: US 9,157,531 B2
(45) Date of Patent: Oct. 13, 2015

(54) BRUSH-TYPE CIRCULAR SEAL

(71) Applicants: Commissariat à l'énergie atomique et aux énergies alternatives, Paris (FR); Technetics Group France SAS, Saint Etienne (FR)

(72) Inventors: Laurent Guimet, Unieux (FR); Frédéric Sauvinet, Saint Etienne (FR); Olivier Constant, Saint Jean Bonnefonds (FR); Philippe Reynaud, Bellegarde en Forez (FR); Christophe Mengelle, Saint Just-Saint Rambert (FR); Michel Lefrancois, Saint Etienne (FR)

(73) Assignees: COMMISSARIAT A L'ENERGIE ATOMIQUE ET AUX ENERGIES ALTERNATIVES, Paris (FR); TECHNETICS GROUP FRANCE SAS, Saint Etienne (FR)

( * ) Notice: Subject to any disclaimer, the term of this patent is extended or adjusted under 35 U.S.C. 154(b) by 0 days.

(21) Appl. No.: 14/423,902

(22) PCT Filed: Sep. 9, 2013

(86) PCT No.: PCT/EP2013/068547
§ 371 (c)(1),
(2) Date: Feb. 25, 2015

(87) PCT Pub. No.: WO2014/037547
PCT Pub. Date: Mar. 13, 2014

(65) Prior Publication Data
US 2015/0226331 A1    Aug. 13, 2015

(30) Foreign Application Priority Data

Sep. 10, 2012 (FR) ...................... 12 58474

(51) Int. Cl.
F16J 15/44 (2006.01)
F16J 15/32 (2006.01)

(52) U.S. Cl.
CPC .......... F16J 15/3232 (2013.01); F16J 15/3252 (2013.01); F16J 15/3268 (2013.01)

(58) Field of Classification Search
CPC .......................... F16J 15/3284; F16J 15/3288
See application file for complete search history.

(56) References Cited

U.S. PATENT DOCUMENTS 5,066,024 A * 11/1991 Reisinger et al. ............. 277/355
5,423,557 A *  6/1995 De Villepoix et al. ........ 277/554

(Continued)

FOREIGN PATENT DOCUMENTS

EP      1 203 178 B1    5/2002
EP      1 775 502 A1    4/2007

(Continued)

OTHER PUBLICATIONS

Search Report issued in French Patent Application No. FR 12 58474 dated May 2, 2013.

(Continued)

Primary Examiner — Gilbert Lee
(74) Attorney, Agent, or Firm — Pearne & Gordon LLP

(57) ABSTRACT

The seal comprises a casing made of two portions (1, 2) crimped into one another with an accurate hermetic position adjustment at interfaces (15, 6b) and a composite structure comprising inside the casing an advantageously flexible and resilient core (24) and a winding (20) of brush bristles. This structure directly extends facing internal faces (9, 10) facing each other in the casing, which compresses the same and has an arcuate shape having a slightly higher radius of curvature. The composite structure is held at an accurate position, firmly but free of constraint.

15 Claims, 3 Drawing Sheets

(56) References Cited

U.S. PATENT DOCUMENTS

| | | | |
|---|---|---|---|
| 5,688,105 A * | 11/1997 | Hoffelner | 415/170.1 |
| 8,011,666 B2 * | 9/2011 | Plona | 277/355 |
| 2008/0284107 A1 | 11/2008 | Flaherty | |
| 2010/0327535 A1 | 12/2010 | Grace | |
| 2011/0018204 A1 * | 1/2011 | Beichl | 277/300 |

FOREIGN PATENT DOCUMENTS

| | | | |
|---|---|---|---|
| FR | 2 151 186 A5 | 4/1973 | |
| FR | 2 692 019 A1 | 12/1993 | |
| WO | 01/13013 A1 | 2/2001 | |
| WO | 2010/063269 A2 | 6/2010 | |

OTHER PUBLICATIONS

International Search Report issued in Application No. PCT/EP2013/068547 dated Mar. 17, 2014.

Written Opinion issued in Application No. PCT/EP2013/068547 dated Mar. 17, 2014.

* cited by examiner

BRUSH-TYPE CIRCULAR SEAL

The invention relates to a brush-type circular seal, typically used for sealing between two pressurized compartments of a turbojet engine (or a turbomachine).

Turbojet engines have tubular compartments in which different pressures prevail. A single rotor shaft passes through these compartments. Upon the shaft passing between said compartments, it is therefore important to provide a sealing between a stator (the structure of the compartments) and a rotor (the shaft). Due to the extreme conditions of this type of environment (high temperatures, strong radial differential expansions between the rotor and the stator), a suitable technology uses the brush-type seal, such as for example in WO 2010/063269. The brush-type seal has a sufficient sealing level for such applications, can withstand high temperatures if it is constructed of suitable materials, and has a good adaptability to the radial differential expansions.

In WO 2010/063269, the brush-type seal is made in section of a central snap ring around which are consecutively wound the network of bristles and a C-shaped cage opened on its internal diameter; this cage acts as to hold and protect said network. In another embodiment, set forth in FR 2692019, the central snap ring is replaced by a spring-type seal surrounded by covers, the latter being described in FR 2151186, which, thanks to its resiliency, provides a tight contact between the C and the contacting surfaces. This is particularly very interesting if the brush-type seal is between two different pieces of compartments: it then provides sealing between both pieces of compartment against the environment external to the turbojet engine. In this embodiment, the C is usually extended on its internal diameter by two parallel strips intended to hold the structure of the network of bristles as close as possible to the rotor, in order to prevent the network from being ruffled when contacting said rotor.

The designs appearing in WO 2010/063269 or FR 2692019 have a common drawback: closing the C has to be made according to the cases by stamping or flospinning, these processes giving by nature large dimensional tolerances. These large tolerances bring about various constraints in constructing the turbojet engine.

In EP-A-1203178, the inventor uses as a base a construction in which a brush-type seal with a central snap ring and a C-shaped cage is mounted in a two-part casing, a crimping preferentially providing the link between both parts of said casing. If this crimped casing has the advantage of having tight geometric tolerances, it has on the other hand the disadvantage of increasing the size of this brush-type seal module, which makes it more difficult to be housed into its environment. Furthermore, the height of this casing depends on the initial height of the C; the issue of large tolerances is therefore not solved regarding the height.

Finally, in all these constructions, no element can be seen that enables explicitly the brush-type seal to be held in rotation. The latter is systematically provided via an axial compression. A loss of said compression in operation, due for example to differential expansions, would thus imply a loss of said rotation holding.

The invention provides a brush-type seal construction having tight external tolerances and reduced overall dimensions. In summary, it is a brush-type seal, from which the C structure around the network of bristles is removed, and where the network of bristles is directly inserted in an external casing, which is in principle closed by crimping. Thanks to its construction, this seal enables sealing towards the outside to be provided between two different pieces of compartments sandwiching said seal, in spite of the C being absent. A system enabling the seal to be held in rotation in its housing can also be integrated.

The circular casing first has a first portion, called "cage". In section, this cage comprises a cylindrical part and a radial return directed to the inside or the outside depending on whether the casing surrounds the brush or whether the brush surrounds the casing; this section thus evokes the shape of a capital letter "L".

The internal face of said radial return acts as a bearing face for a composite structure comprising a central core, around which the network of bristles of the brush-type seal is wrapped. The orientation of both ends of each bristle is the same as the one of said radial return (towards the inside or the outside). In the end, the structure comprises two diameters: a diameter formed by the ends of the bristles, thereafter called a "brush diameter", and another in the winding area around the core, thereafter called a "smooth diameter".

A second portion of the casing, called a "chock", is then inserted into the lower cage, centred on the cylindrical part of said cage. The internal face of this chock comes bearing on said composite structure. The axial position of this chock in the cage is limited by an axial contact, generally metal-metal, between two opposite planar surfaces in each of both pieces. We have de facto an accurate tolerance regarding the height of the casing. The position of this contact is also calculated in order to generate a slight compression of the composite structure, which enables a good mechanical holding of the network of bristles, particularly thanks to the resiliency of the spring which is part of the core, in some of the best embodiments of the invention. This compression is made reliable thanks to said metal-metal contact, and the reaction force of the spring can be repeated from one piece to the other. This properly used resilient reaction makes the crimping reliable over time.

The upper chock can comprise an axially protruding part on the face thereof external to the casing. The casing is closed by crimping. The top of the cylindrical part is folded up on the protruding part, which provides sealing of the crimping. A leak path generated by the C structure being absent is thus closed around the network of bristles. In parallel, the overall dimensions are optimized via the elimination of this same C structure.

One significant aspect of the invention consists in optimizing the geometry of both bearing surfaces of said composite structure. On the cage as well as on the chock, concave tubs are axially dug on said radial returns rather than choosing rectilinear bearing surfaces. In cross-section, they have an arc shape. The centre of each arc is preferentially situated on a diameter identical to the average diameter of the core. The radius of each arc is greater than or equal to the largest radius of the network of bristles, once the latter is wound on the core. The presence of these tubs enables the composite structure to be self-centred by other means than the smooth diameter thereof, with an adjustment to the not very accurate tolerances in the casing. Shear stresses on the network of bristles are also reduced. The rotation holding of the network is also improved, since the contact area between the network and the bearing faces is not only occasional, but extends on a larger width.

On the thus improved assembly, it is now possible to leave some clearance between the smooth diameter of the composite structure and the diameter facing the lower cage, but without degrading the centering of the composite structure in the cage. Upon crimping, this enables a radial contact between the composite structure and the cage to be prevented upon crushing the seal. Such a contact would result in considerably increasing the stiffness of the core when it is resilient and flexible, causing de facto a risk of crimping breakage.

Once assembled, the seal has two external planar surfaces. This enables if necessary an anti-rotation device of the seal to be inserted in the housing thereof, such as a blind hole enabling a pin having a length greater than the depth of said hole to be accommodated. Once this pin is assembled, it will protrude and will be ready to be inserted in a hole of the seal housing, in order to finally provide the rotation holding.

In a preferred embodiment, the chock as well as the cage each have a lip with a radial circular protrusion directed in the same direction as the ends of the bristles. These protrusions encircle the network of bristles and enable the network of bristles to be held very close to its ends (in the contact area with the rotor) and thus the ruffling of said network to be prevented when the seal is in operation. Also, the thickness of the network of bristles is controlled, thanks to the previously mentioned metal-metal contact, which enables the sealing performance of the thus formed brush to be optimized.

These protrusions can be rounded at the end of the contact area with the bristles in order to limit shear and a risk of severing the latter, if they are caused to be axially folded against said protrusions.

The smooth diameter of the casing (opposite the brush) can be machined in order to allow a hooping in the housing and thus optimize sealing between the seal and said housing.

Finally, in some cases, the core can be chosen flexible enough in order to avoid a too significant stiffness, which would result in preventing crimping or in over-crushing the bristles. Such a flexible core could be only made of an open circular cover having a C section, instead of such a cover with a coiled spring.

Other advantages and characteristics of the invention will appear upon reading the description of an embodiment thereof, given purely by way of exemplary illustration, with reference to the appended drawings, in which.

Figure 1:
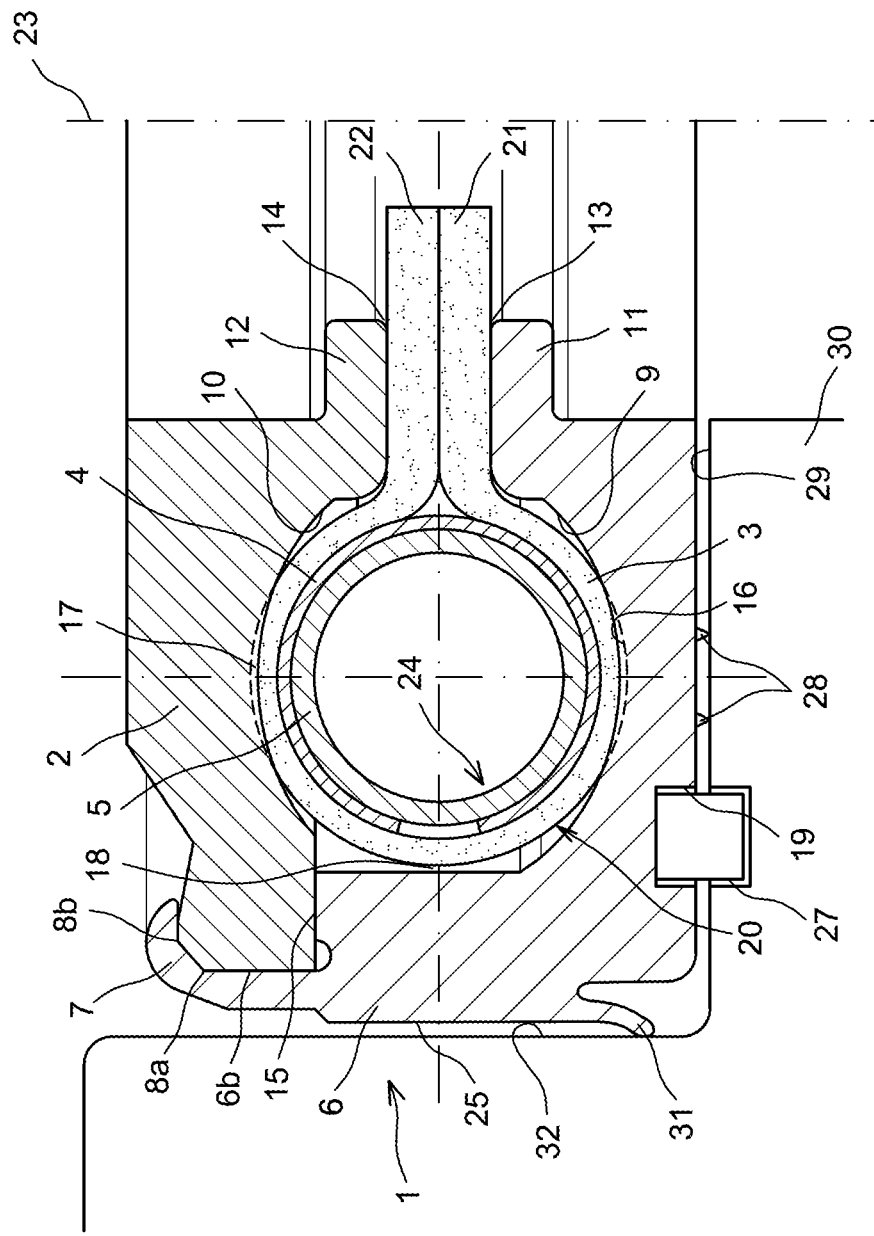
FIG. 1 represents a cross-section view of such a seal according to the invention, here with a brush on its internal diameter.
Figure 2:
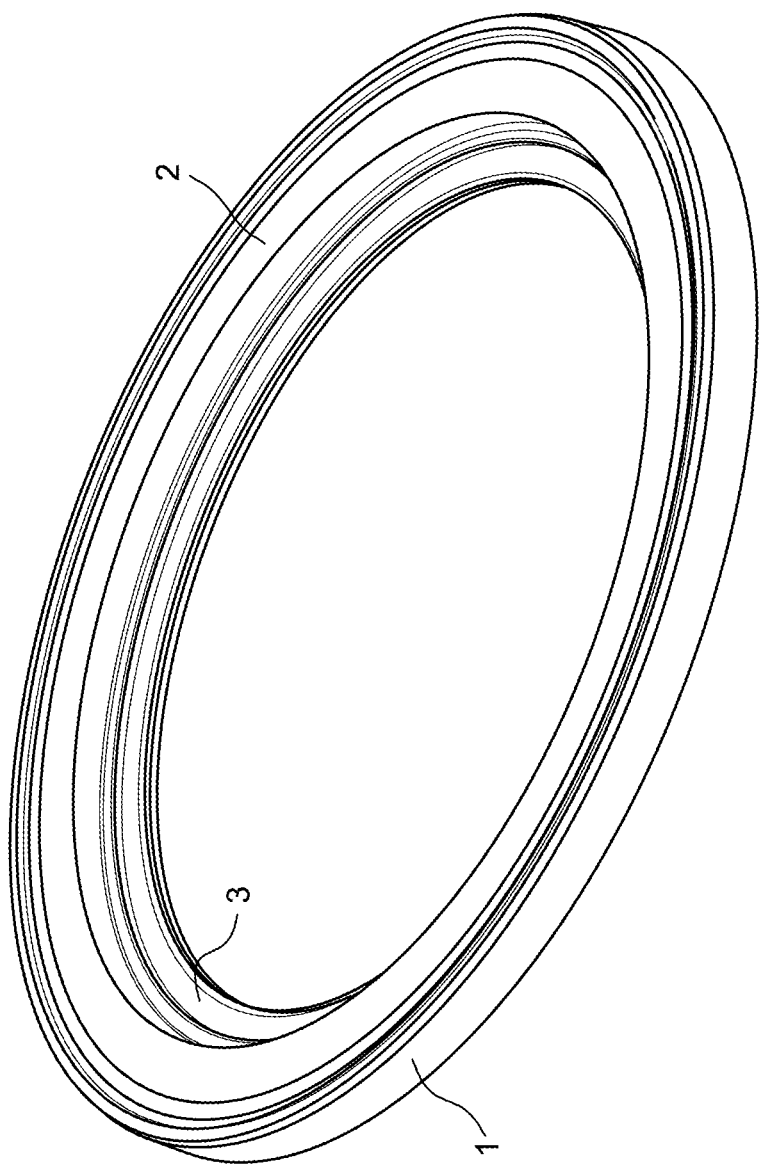
FIG. 2 represents a perspective view of a brush-type seal.
Figure 3:
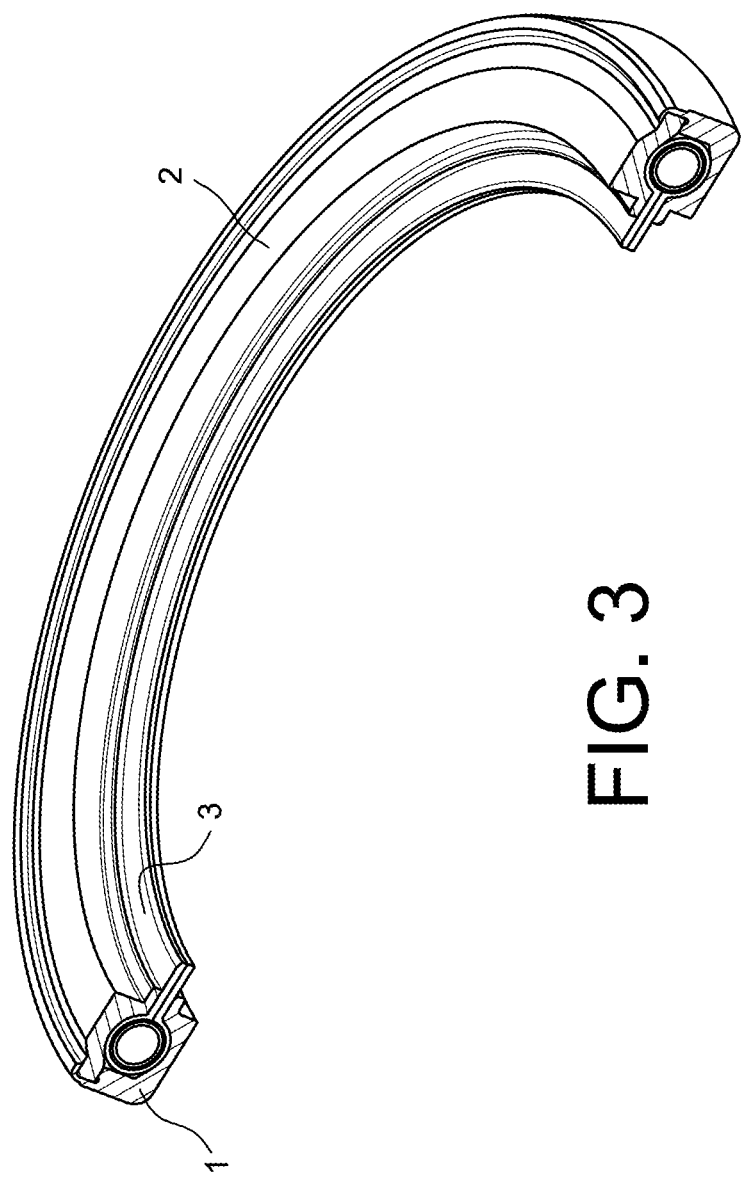
FIG. 3 represents a three dimensional cross-section view of the brush-type seal.

The represented brush-type seal is circular around a central axis 23. Firstly, it comprises a low cage 1 (according to the herein chosen representation for the drawings). It also comprises a composite structure, made of a layer of bristles 3 and a core 24. The latter has herein a hollow section and is made of a coiled metallic spring 5, wound as a loop around the seal and of a metal cover 4, having a C opened section, which surrounds and protects the spring 5. Such seals are known and sold in particular under the trademark HELICOFLEX®. The invention integrates the latter in some of its preferred embodiments; other embodiments of the core are possible, comprising for example only the cover 4, which gives a greater flexibility. The layer of bristles 3 has a surrounding part 20, wound around the core 24, and parallel strands 21 and 22, radially directed to the inside and in charge of sealing. The largest diameter of the winding 20 is called a "smooth diameter" and extends, when the seal is assembled, at a short distance from one face, internal to the casing, of a cylindrical part 6 which makes up a first part of the cage 1.

The casing is closed by an upper chock 2 which is crimped in the cage 1. To do this, the cylindrical part 6 has a recess at the upper end thereof, around which it remains as a thinner lip 7. The chock 2 is in a centred contact with the cylindrical part 6 of the cage 1 by a contacting peripheral interface 6b between the face thereof having the largest diameter and the internal face of the lip 7, as well as by a radial extending stop interface 15, which is advantageously perfectly planar, between the lower face thereof and a planar face making up the bottom of the recess of the cylindrical part 6. The adjustment is accurate enough in order to provide a sealing of the casing, thanks in particular to the flatness of the faces belonging to the stop interface 15, and especially as the cage 1 and the chock 2 are generally constructed of metal, and therefore rigid.

The faces internal to the casing facing one another of the cage 1 and the chock 2 are formed concave, as tubs 9 and 10, respectively, so as to retain the composite structure. The winding 20 has a larger diameter than the distance between the bottoms 16 and 17 of the tubs 9 and 10. The tubs 9 and 10 are symmetrical and have radiuses of curvature at least equal to, and here larger than, the radius of the winding 20. Finally, the centres of curvature, as well as the bottoms 16 and 17 of the tubs 9 and 10 are aligned with the centre of the winding 20 and of the core 24 for each section of the seal, and are preferably at a same distance from the central axis 23. Thanks to this constitution, the composite structure is held at a known repeated position for each section and each seal constructed in the same way, the winding 20 and the core 24 being held in place by being slightly compressed into the bottoms 16 and 17 of the tubs 9 and 10. They deform by slightly flattening, partially occupying the tubs 9 and 10 and by widening, in particular towards the cylindrical part 6. The radial clearance 18 between the winding 20 and the cylindrical part 6 however allows a deformation without an excessive stress of the composite structure inside the casing. There is also a clearance opposite the casing, on the side of the strands 21 and 22. This compression is made possible under good conditions by the flexibility and the resiliency of the core 24 herein described.

The casing is closed by crimping, the lip 7 of the cage 1 being folded up thanks to a tool on the chock 2 by covering the rim of the face thereof external to the casing, opposite the tub 10. In the covering area, the chock 2 is conformed to two angular portions 8a and 8b the latter of which protrudes towards the outside in the direction of the seal central axis (23). Upon closing the lip 7 on this protruding portion, the sealing of the crimping is ensured.

The cage 1 comprises a blind hole 19 on its external face, which is intended to accommodate a pin 27 having a length greater than the depth of this hole and will thus protrude. It will constitute a rotation locking system for the brush-type seal in the housing thereof.

The cage 1 and the chock 2 each contain a lip, respectively 11 and 12, protruding from the internal diameters, and the function of which is to held the strands 21 and 22 in place by inserting them. The distance between the lips 11 and 12 is defined by the stop at the interface 15, as well as the density of the brush bristles in this active area. The lips 11 and 12 have rounded parts 13 and 14 at their edge adjacent to the bristles in order to avoid the risk of shear if they are flexed in use.

The external diameter 25 of the cage 1 is an area where the sealing with the future housing of the seal will have to be ensured. It can then be machined with an accuracy sufficient to be hooped in this housing.

The casing can be fitted with sealing means at the external faces thereof. FIG. 1 shows that the embodiment herein provided comprises knives 28, which are triangular section lips tapering towards the free end, raising on the external planar face of the cage 1. The knives 28 are circular, concentric and bearing against a facing face 29, which is also planar, of the support piece 30 of the seal when the latter is mounted. The external diameter 25 of the cage 1 (peripheral face) can comprise a flexible lip 31 radially protruding towards the outside and bearing against a bored face 32 of the piece 30.

Deforming these reliefs of the cage 1 on the piece 30 therefore ensures the sealing of the seal by avoiding leaks around the same. O-rings provided at the same locations and housed in grooves of the cage 1 would have the same effect.

What is claimed is:

1. A brush-type circular composite seal, comprising:
   a circular casing made of two crimped portions, a first portion of which, called a cage (1), comprising a cylindrical part (6) and a radial return joined to the cylindrical part and comprising a first radial bearing face (9) internal to the casing, and a second portion, called a chock (2), centred on the cylindrical part (6), radially extending and comprising a second bearing face (10) internal to the casing and facing the first bearing face (9);
   a composite structure consisting in a core (24) internal to the casing and a network of bristles disposed into a winding (20) around the core (24) and comprising two parallel strands (21, 22) coming out of the casing between the cage (1) and the chock (2);
   wherein:
   the cylindrical part (6) and the chock (2) have a mutual stop radially extending interface (15);
   the winding (20) is in contact with the bearing faces (9, 10);
   and the bearing faces (9, 10) are curved into concave tubs, having radiuses of curvature at least equal to the one of the winding (20).

2. The brush-type seal according to claim 1, wherein the core (24) is metallic and with a hollow section.

3. The brush-type seal according to claim 2, wherein the core is made of a coiled spring (5) and an open section cover (4) surrounding the spring.

4. The brush-type seal according to claim 1, wherein the tubs have bottoms separated by a distance lower than a free external diameter of the winding at an assembling position of the casing, a clearance remaining between the winding (20) and the cylindrical part (6).

5. The brush-type seal according to claim 1, wherein the tubs are symmetrical and have bottoms (16, 17) situated, as well as a centre of the core and of the winding, at a same distance from a seal central axis.

6. The brush-type seal according to claim 1 wherein the cage and the chock each comprise a lip (11, 12), the lips flanking the bristle strands by extending parallel to each other and radially opposite the cylindrical part (6).

7. The brush-type seal according to claim 1 wherein the cylindrical part comprises a recess the bottom of which is formed by the mutual stop radially extending interface (15), and which is bounded by a terminal lip (7) of the cylindrical part, the chock (2) being surrounded by the terminal lip and in contact with the same by a peripheral interface (6*b*), the terminal lip being curved by covering a rim of a face of the chock which is opposite the second bearing face and external to the casing.

8. The brush-type seal according to claim 7, wherein the chock has at least one angular portion (8*b*) at the peripheral interface.

9. The brush-type seal according to claim 8, wherein the angular portion is protruding in the direction of a seal central axis (23).

10. The brush-type seal according to claim 1, wherein the stop radially extending interface (15) is planar.

11. The brush-type seal according to claim 1, wherein the first portion of the casing comprises a blind hole (19) housing a rotation locking pin (27) of the seal.

12. The brush-type seal according to claim 1 wherein the casing comprises external sealing means.

13. The brush-type seal according to claim 12, wherein the sealing means comprise protruding reliefs.

14. The brush-type seal according to claim 13, wherein the reliefs comprise triangular section knives (28).

15. The brush-type seal according to claim 13, wherein the reliefs comprise a deformable lip (31).

* * * * *